United States Patent [19]
Wells et al.

[11] Patent Number: 4,717,251
[45] Date of Patent: Jan. 5, 1988

[54] ELEVATION MEASUREMENT IN HIGH ORDER SURVEYING

[75] Inventors: Leon W. Wells, Closter, N.J.; William E. Mimmack, El Paso, Tex.; Werner Hauschild, Whippany, N.J.

[73] Assignee: Cubic Corporation, San Diego, Calif.

[21] Appl. No.: 826,732

[22] Filed: Feb. 6, 1986

[51] Int. Cl.$^4$ .................. G01C 3/08; G01C 1/10; A47G 23/02; F16M 11/14
[52] U.S. Cl. .................................. 356/4; 33/291; 248/146; 248/182; 248/DIG. 10; 356/1; 356/3; 356/149; 356/152
[58] Field of Search ................. 356/1, 4, 5, 152, 3, 356/11, 16, 149, 250, 147, 154; 33/291, 293; 248/DIG. 10, 182, 146

[56] References Cited

U.S. PATENT DOCUMENTS

| | | | |
|---|---|---|---|
| 392,209 | 11/1888 | Lee | 248/182 |
| 622,045 | 3/1899 | Hein | 248/182 |
| 686,872 | 11/1901 | Whetham | 248/182 |
| 981,968 | 1/1911 | Beck | 356/16 |
| 2,161,718 | 6/1939 | Miller | 248/182 |
| 3,552,866 | 1/1971 | Huther | 356/250 |
| 3,617,131 | 11/1971 | Taguchi | 356/149 X |
| 3,874,087 | 4/1975 | Nunlist | 356/5 X |
| 3,907,432 | 9/1975 | Bersani | 356/3 X |
| 3,936,197 | 2/1976 | Aldrink et al. | 356/149 X |
| 4,162,696 | 7/1979 | Sprung | 248/DIG. 10 |
| 4,240,745 | 12/1980 | Green | 356/4 |
| 4,311,384 | 1/1982 | Keene | 356/152 |
| 4,343,550 | 8/1982 | Buckley et al. | 33/293 X |
| 4,447,149 | 5/1984 | Marcus et al. | 356/5 |
| 4,470,698 | 9/1984 | Green, Jr. et al. | 356/152 |
| 4,572,662 | 2/1986 | Silverman | 356/5 |

Primary Examiner—Stephen C. Buczinski
Assistant Examiner—Linda J. Wallace
Attorney, Agent, or Firm—Lionel N. White

[57] ABSTRACT

A surveying instrument and procedure are provided for the precise determination of elevation differences in the course of a surveying traverse. The instrument comprises an optical wedge 13 situated on the horizontal longitudinal line of sight axis 27 of the primary optical system between the objective lens 11 and a target under observation. The wedge is arranged for rotation about this axis and with such rotation angularly displaces the diverted line of sight 28 from the horizontal to the plane of the target. The degree of rotation required of the wedge to acquire the target 33 is measured by electro-optical angle encoder means 10, and the distance to the target by EDM means 24, 26. The difference in elevation is calculated trigonometrically by computer means utilizing as data the wedge diversion angle, the sine function of its rotation, the computed angular displacement of the line of sight, and the distance to the target. The procedure further includes the cooperative employment of two such instruments 20, 30 each as the target for the other, to thereby increase the accuracy of measurement through the averaging of the combined results. Also included in the instrument is a mislevel compensation system 60 which provides both optical and electronic correction in the event of mechanical deviations in the orientation of the instrument.

7 Claims, 6 Drawing Figures

ELEVATION MEASUREMENT IN HIGH ORDER SURVEYING

BACKGROUND OF THE INVENTION

During recent years attempts have been made to utilize "total station" electronic instrumentation in high order surveying to provide computer-processible data relating to the distance and difference in elevation between measuring stations, or between a measuring station and a previously established benchmark. While electronic distance measuring (EDM) components of such instrumentation have been developed to a degree such that the line-of-sight, or slant, distance between stations can readily be determined in a short time with high order accuracy, elevation measurement continues to require substantial preparation time and extended periods of manipulation to obtain high order data.

A basic problem with presently available electronic elevation measuring instrumentation lies in its continued reliance upon elevation angle determination in the manner of the surveying theodolite of which it is normally a part. In such practice, as is described, for example, in U.S. Pat. No. 4,146,927, measurement usually entails establishing the horizontal datum plane of the line of sight of the instrument, displacing this line of sight by pivoting the entire telescope or sighting element about the horizontal axis of the alidade sufficiently to acquire the target, determining the angular degree of such pivoted displacement from the datum, and applying the measured degree of such pivoting and the measured distance between the station and the target to determine trigonometrically the difference in elevation. The fact that high order surveying requires resolution of the extent of such pivoted angular displacement to within 0.5 arc second readily indicates the essence of the problem encountered with instrumentation available to the surveyor prior to the present invention.

An additional concern in modern high order surveying is the need for a system which will provide volume productivity through mobility and rugged construction, yet will retain the accuracies normally associated only with more fragile and delicate instrumentation. Such a practical system must also enable short elapsed station time by allowing rapid set-up, stabilization, and measurement data acquisition. The instrument and measuring procedure of the present invention effectively satisfy these various requirements, and provide today's mechanized surveyor with the means for accomplishing wide range high order network surveying with minimum delay and difficulty.

SUMMARY OF THE INVENTION

The surveying procedure of the present invention utilizes a unique elevation angle measuring instrument which is capable of operating under resident computer control to automatically acquire a target station and determine its angular elevation, or declination, from the measuring station to within 0.5 arc second over a broad practical range, for example about +/−6 degrees. The instrument may be employed with a passive retroreflector target located at an established benchmark or, preferably, may be used with a second similar instrument in a procedure in which each utilizes as its target an illuminated point on the line of sight of the other to thereby yield measurement data which are not only highly precise in the first instance, but which may be reciprocally averaged for even further accuracy.

Unlike previously utilized surveying instruments, the present system, rather than tilting the instrument telescope to view the target along a virtually straight line of sight from observer to target, in effect merely diverts that segment of the line of sight beyond the objective lens to a precisely measurable degree from the horizontal datum line maintained within the instrument. This line of sight diversion is accomplished through the use of an optical wedge situated on and rotatable about that segment of the line of sight lying between the objective lens of the instrument and the target, thereby causing the line of sight to describe, with such rotation, a cone whose vertex angle is determined by the preselected wedge structure. In the instrument suggested above, for example, the vertex would extend in the vertical plane over the range of about 12 degrees.

Use of this wedge results in a number of advantages, not the least of which are the movement of only a small, lightweight element symmetrically about the longitudinal axis of the instrument, thus minimizing torsional strain in the vertical plane which might otherwise generate error in the elevation angle measurement, and the provision for obtaining nearly an order of magnitude greater resolution in measurement of line of sight diversion by virtue of the fact that the actual vertical displacement of the sight of the instrument is only equal to the sine vector of the rotational displacement of the wedge. Thus, currently available electronic angle measuring instrumentation, such as described in U.S. Pat. No. 3,768,911, may be effectively employed to obtain a degree of resolution of line of sight diversion greater in actual practice by about ten times that achievable with such previous devices in the normal telescope tilting procedure.

In view of the fact that wedge diversion of the sight of the instrument describes a circle in the plane of the target, provision is made through the azimuth circle measuring capability available in a "total station" to couple servo-motor systems under computer control to drive this instrument in both azimuth displacement and wedge rotation to direct the line of sight in the vertical plane alone or also across a narrow spread in the horizontal plane to facilitate visual acquisition of the target. With the present invention such control may initially be in an active loop with the operator, and after coarse target acquisition may be taken up automatically in a closed loop which includes image position-sensing means, such as a charge-coupled device (CCD) array in combination with a sensible reticle image eminating from the target. The invention also provides such an illuminated target projection system to be employed in either the cooperative two-instrument or the single instrument measuring procedure.

Included in the instrument of this invention are also means for establishing the "spirit level" horizontal datum of the longitudinal axis and maintaining that datum through a combination of visual and digital data compensation. Incorporated with these means in the instrument are an EDM system and computing means for calculating and displaying the ultimate elevation measurement as well as providing the automatic and interactive control of the instrument functions during measurement procedures.

Utilizing an instrument of the present invention, a typical measurement would proceed in the following manner. First, the instrument is transported to the desired station, for example by vehicular means upon which it is mounted for mechanical dismounting temporarily during a measurement cycle. At the station the instrument is set upon the terrain where, responding to the incorporated gimbal-type support means, the alidade base settles to a "bubble level" attitude of about +/−0.5 degrees from the horizontal. The support means are then locked to firmly retain the base in a stationary position while the internal mislevel sensor determines the precise attitude of the longitudinal axis of the instrument with respect to the horizontal datum, and the beam-deflection wedge is rotated to its initialized, or "zero", position in which its plane of deflection coincides with the horizontal datum plane of the instrument.

Assuming that measurement is to be made with respect to an established benchmark, a retroreflector of the common cube-corner type is located at the benchmark station. A surveying class laser projector, preferably of the visible type such as one having a HeNe source, is arranged within the instrument such that its emitted light proceeds through the objective lens to incidence upon a "pin-hole" mask located on the surface of the beam-deflecting wedge at its axis of rotation. From this point the laser light is transmitted to the retroreflector target which is coarsely acquired visually through the instrument optics by means of operator-directed azimuth sweep of the instrument alidade and rotation of the deflection wedge.

Reflection of the projected light from the target is deflected by means of a beam-splitter within the instrument to imaged incidence upon a CCD array from which fine-position signals are obtained for computer processing to direct automatic azimuth sweep and wedge rotation to effect positioning of the reflection image at the centrix of the array. At this point the extent of rotation of the wedge from its zero datum is determined by means of the incorporated angle-measuring system, and the actual line-of-sight angular displacement from the horizontal datum is calculated in the computing means of the instrument.

Concurrently with the taking of the angular measurement, an incorporated EDM system, utilizing the retroreflector target, determines the slant, or line-of-sight, distance between the instrument and the benchmark. This distance is then utilized with the vertical angle measurement in the computer means to determine the precise difference in elevation between these two stations.

Subsequent measurements along the course of a survey are preferably obtained with even greater accuracy by the use of two instruments of the present invention, each viewing as its target the laser light emission "pin-hole" of the other. The previously described acquisition and calculation steps in the measuring procedures are independently accomplished by each instrument and then the results are averaged to achieve the noted improvement in accuracy.

DRAWINGS

The present invention may be more clearly understood by reference to the accompanying drawings of which:

DESCRIPTION OF THE INVENTION

Figure 2:
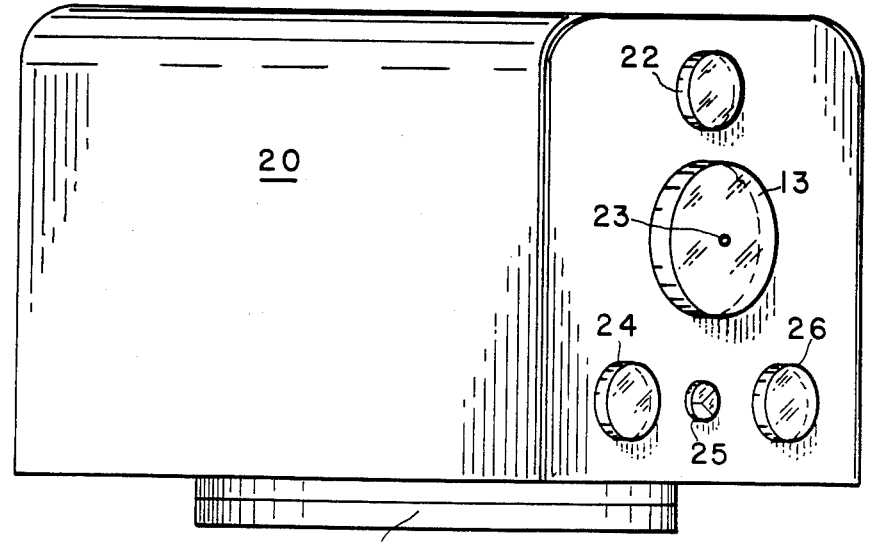
FIG. 2 is a right front quarter isometric view of a surveying instrument embodying the present invention.

A surveying instrument embodying of the present invention may be seen in FIG. 2 as comprising an outer casing 20 on the front panel of which is situated the main objective optics, represented by diverting wedge 13, and auxiliary viewing optics 22. Also situated at this panel are the basic optical elements of a common electronic distance measuring (EDM) system, namely light-emitting optics 24 and return beam receiving optics 26. Included in the present system for purposes of the surveying procedure peculiar to this invention, and which will be described later in greater detail, is a cube-corner retroreflector 25. This entire instrument is mounted upon an angle-encoding base 21 which is employed in the usual manner to determine the degree of azimuth displacement of the line of sight, or longitudinal axis, of the instrument.

Figure 1:
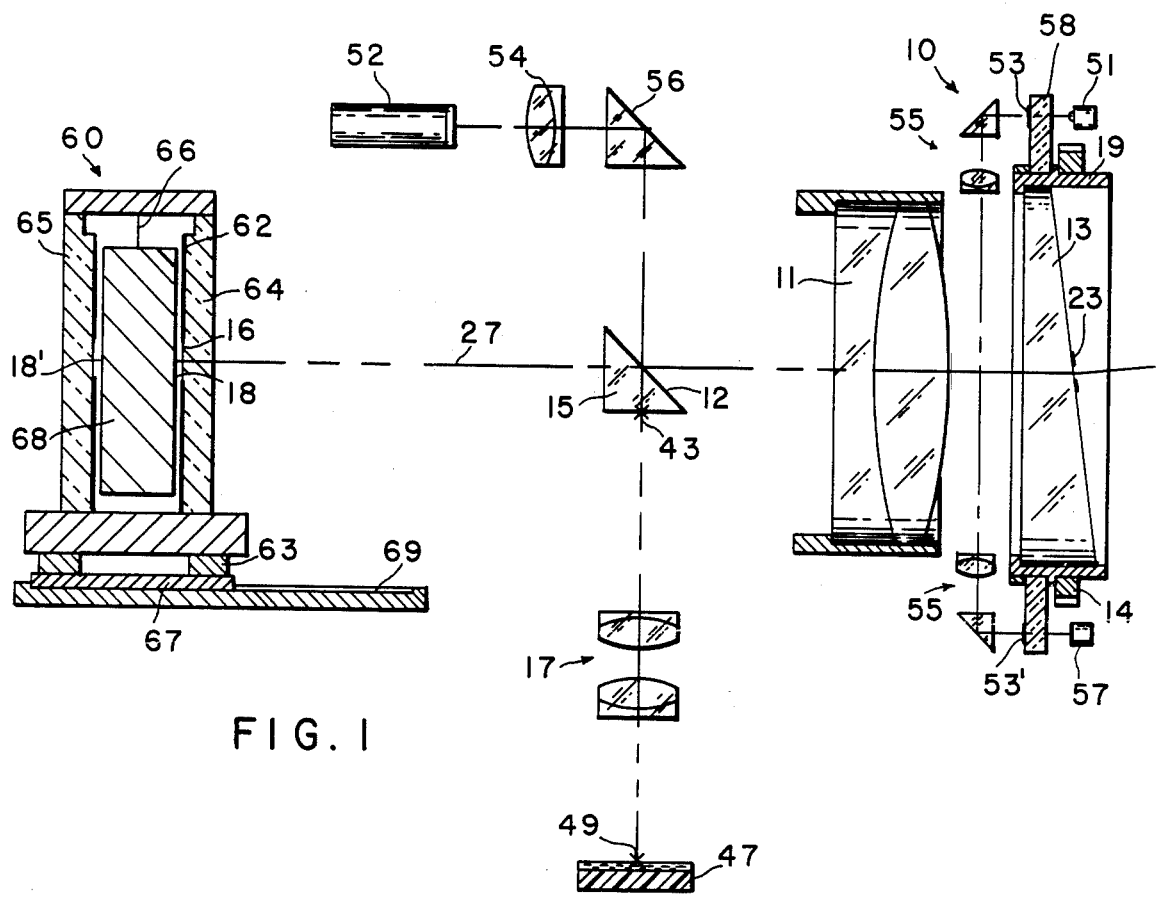
FIG. 1 is a schematic representation of the optical system of a surveying instrument embodying the present invention.

The optical system resident within the casing 20 of the surveying instrument, and which in particular comprises the present invention, is shown schematically in FIG. 1. The primary objective lens set 11 is situated on the longitudinal axis of the instrument and, with reflective surface 18 of pendulum 68 and reflective surface 12 of prism 15, comprises the main imaging system of the instrument. Light entering the instrument from the right-hand side of FIG. 1 follows the noted path through objective lens 11 and, after reflection from surfaces 18, to effect a horizontal datum, and 12, is focused at reticle 43. Transfer lens set 17 refocuses the light subsequently at 49 on the surface of CCD element 47. Video display means, not shown, may be employed to enable the operator to view the spatial relationship of image 49 to the centrix of the photoelement array of CCD 47 to allow manual direction of the instrument, or the output from the CCD may be utilized directly in a servo-drive system which will automatically direct the instrument to center upon the target, as will later be further described.

Reflective surface 18 is the polished surface of pendulum weight 68 of mislevel sensor 60 which is of the general type described in U.S. Pat. No. 4,077,132. As noted, in its use in the present invention this device provides a direct optical compensation for any elevational displacement of the longitudinal axis of the surveying instrument, and additionally generates digital data indicative of any residual displacement. These data may be utilized in the computation means of the instrument to determine the extent of any such displacement and to ultimately provide appropriate correction in the data output at the conclusion of a survey measurement.

Mislevel sensor 60 is structured primarily as described in the noted patent specification, having opposed walls 64, 65 which pneumatically enclose weight 68 pendulously suspended by leaf 66 and provide an air-damped environment for movement of the weight with elevational tilt of the longitudinal axis, or internal line of sight, of the surveying instrument. Since weight 68 serves not only as the moveable element of the capacitor which comprises mislevel sensor 60, but also provides the mid-path reflector for the main optical system of the instrument, the axis-perpendicular surfaces 18, 18′ of its metal body are polished to within about 0.5 second of parallel and are provided with a deposited layer of highly-reflective metal, such as gold.

In order to enable access of the light path to these reflective surfaces, enclosing wall 64, 65 are constructed of transparent material, such as glass. However, since these walls comprise the stationary capacitor electrodes it is necessary that they also carry on their inner faces deposited layers 62 of conductive material, such as the silver employed in the present embodiment. In the event that such opaque conductive materials are employed, window areas 16 are left uncoated sufficiently to allow transmittal of the incoming light. Such windows detract little from the overall area of capacitor layers 62, and of course would not be necessary if use of transparent conductive materials were elected.

The main optical system described thus far comprises, in this preferred embodiment, objective lens 11 of about 100 mm. diameter with a focal length of about 550 mm., and relay lens set 17 having about 8 to 10 power magnification. The resulting receiver system has an effective focal length, from objective lens 11 to CCD sensor 47, of about 5.0 meters. Considering that this system will be employed in surveying measurements which may practically vary in the range of from 6 to 250 meters, it is imperative that it be capable of effective focus variation over the whole of this range. To this end, the mislevel sensor/compensator 60 is particularly well suited due to its virtual insensitivity to movement. Means, such as supporting slide 67 and ways 69, are therefore provided to enable displacement of sensor/compensator 60, particularly its mirrored faces 18, 18′, along the longitudinal axis of the instrument to varying distances from objective lens 11 to effect the major degree of necessary focus change.

In addition to its capability of providing optical and electronic level compensation, sensor 60, as arranged in the present embodiment of the invention, provides a measure of compensation for any mechanical imbalances, particularly in its pendulum suspension, which may be inherent in its structure. For this purpose, the body of sensor 60 is mounted upon slide support 67 by means of rotation bearing 63 which enables the entire body of sensor 60 to rotate upon its vertical longitudinal axis. By such rotations over precisely 180 degrees, one and the other of mirrored surfaces 18, 18′ are in turn placed in the optical path of the receiver system during a surveying measurement. The data obtained from the measurement under each such condition may then be averaged to achieve an automatic adjustment for any such imbalance.

Included in the instrument of the present invention is the elevation displacement measuring system which is generally depicted at 10 in FIG. 1. The primary element in this system is optical wedge 13 which is situated on the longitudinal axis 27 of the receiver system and is mounted in holder 19 for rotation about that axis. Wedge 13 has been selected in the present embodiment to effect about a six degree diversion of the line of sight of the receiver system; however, any desired amount of diversion may be achieved simply by insertion of the appropriate wedge element. In fact, a broadly versatile instrument system may be provided with a number of interchangeable wedges for which the instrument may be readily calibrated through its computation capability.

As depicted, for the sake of clarity, in FIG. 1, wedge 13 is positioned to effect maximum upward deflection of the line of sight of the receiver optics, i.e. +6 degrees. With rotation of wedge 13 through action of gearing means 14, and drive means not shown, upon wedge holder 19, the line of sight of the system, depicted at 28 in FIG. 3, moves about the longitudinal axis 27 of the instrument and in effect describes a circle 29 about that axis. The result of rotation of wedge 13 is to change the elevation, or declination, of the line of sight from the horizontal plane of the longitudinal axis by an amount which follows the sine of the degree of rotation. Thus, rotation of wedge 13 through 90 degrees from its position as shown in FIG. 1 would depress line of sight 28 through the full 6 degree range of the wedge, i.e. 6 sin 90=6 degrees. Further rotation of 45 degrees would depress the line of sight another 4.24 degrees below the horizontal plane, i.e. 6 sin 45=4.24 degrees.

As is readily apparent, the angular deflection of the line of sight from the horizontal plane of the longitudinal axis of the instrument is about an order of magnitude less than the actual angular displacement of wedge 13. This effect holds within the range of about +/−60 degrees from the wedge position of horizontal deflection, the preferred range of operation. Although even greater resolution might be directly achieved in the higher angle cosine range, the possibility of making complementary measurement in adjacent symmetrical quadrants provides for greater accuracy through result averaging.

Measurement of the degree of rotation of wedge 13 is achieved through the use of an electronic angular displacement sensing pickup system 10, such as described in U.S. Pat. Nos. 3,244,895 and 3,454,777, which comprises a transparent grating circle 58 affixed to and rotating with wedge holder 19. With such movement of circle 58, the opaque grating markings 53, having a periodicity of about 8200 lines per circle, move past the illumination from light source 51 and their pattern is transferred by prism/lens system 55 to image upon diametrically opposed grating markings 53′, forming a moire fringe pattern whose sinusoidally fluctuating intensity is sensed by photocell 57 for subsequent electronic processing. In this embodiment, resolution of about 0.3 arc seconds is achieved at the pickup head and, being amplified by the order of magnitude resulting from the wedge imolementation, ultimately provides a measure of elevation angle displacement to about 0.03 arc seconds.

The difference in elevation between the instrument and the target under observation is then calculated by application of this angular displacement to the distance to the target as determined by the EDM system which is enclosed within casing 20 of the surveying instrument. Such an EDM system may be any of the many currently utilized in the surveying field, one such being that phase-comparison system described in U.S. Pat. No. 3,778,159. This system may employ a solid-state light source, such as a GaAs laser device, the modulated emission of which is reflected from a retroreflector target element positioned at a benchmark, or from such an element 25 which is incorporated in a companion instrument 30 utilized in the two-instrument surveying procedure depicted in FIG. 3. The modulated beam is transmitted through optics 24 of instrument 20 and, after return from the target reflector, is received through optics 26. In order to improve reception, these, as well as auxiliary viewing optics 22, may include wedges, similar to primary system wedge 13, which are mechanically coupled to rotate with wedge 13, thereby maintaining with it parallel lines of sight.

Also included within instrument 20 is a visible target system which is utilized as an instrument aiming aid in either the one- or the two-instrument procedure, providing both a preliminary instrument direction guide for the operator and an illumination target which can be employed by the servo-aiming system of the instrument. This target system comprises a visible light source, such as HeNe laser element 52, the beam of which is focussed at pin-hole mask 23 on the surface of wedge 13 by means of the optical system comprising lens system 54, reflective prism surfaces 56, 12, and objective lens system 11. The image of this laser beam is sized to slightly over-fill the pin-hole of mask 23 in order to account for any wavering of the beam.

Figure 3:
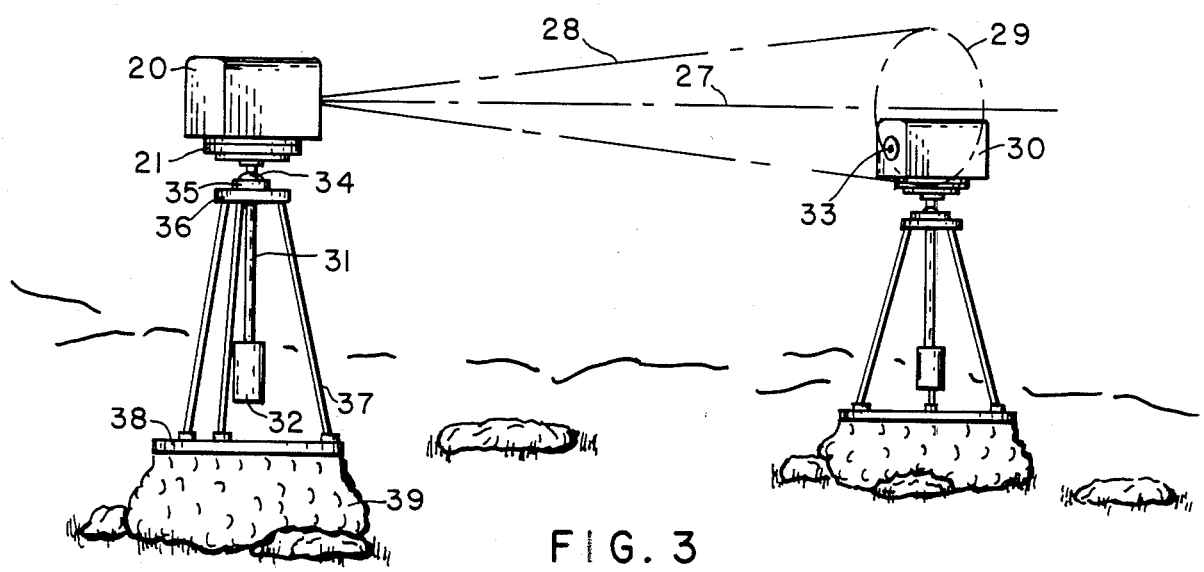
FIG. 3 is an isometric view of two surveying instruments of the type depicted in FIG. 2 arranged as employed in the surveying procedure embodying the present invention.

As shown in FIG. 3, instrument 20 is stably mounted for a measuring procedure by means of a novel system which provides for ready and constant establishment of a base position regardless of terrain conditions, whether rock-strewn, hard-pan, or swampy. This system also provides for self-stabilization of the instrument to establish a nearly horizontal attitude without further manipulation by the operator. In this arrangement, azimuth base 21 of the instrument is removably affixed by usual mounting means to the upper end of support shaft 31 at the lower end of which is affixed counter-weight 32. Shaft 31 is suspended in the center of tripod head 36 by gimbal means which comprises a ball cup bearing situated in head 36 in which bearing is seated sphere 34 which is integral with shaft 31. By this arrangement, sphere 34 is readily rotatable within its seat bearing under the influence of counterweight 32 to cause instrument 20 to achieve a substantially horizontal longitudinal axis attitude even though, as is normally the case, tripod head 36 is not level.

Once instrument 20 has established its level state, as determined by sensor system 60 which may be complemented by a like mislevel sensor, not shown, arranged along the lateral axis, solenoid-actuated locking ring mechanism 35 affixed to head 36 is activated remotely by the operator or automatically by the system control circuit to set sphere 34 against further movement. Head 36 is supported in the usual manner upon legs 37; however, rather than terminating in the common pointed feet, these legs are firmly affixed to platform 38 which comprises part of the universal base system of this invention.

Platform 38 has affixed about its rim a bag 39 of durable yet flexible fabric, such as nylon mesh, enclosed within which are numerous spheres of substantial weight and impermeability. Nylon-coated steel balls of about 40 mm. diameter are an example of useful material. The weight and moldable character of this base combine to provide the immediate stability required of rapid set-up and measuring schedules, particularly where the terrain is misshapen or of a texture which would prevent the firm engagement of normal tripod points. The significant weight of the base is not otherwise a problem in view of the likely fact that in the scheme of large-scale surveying for which the present invention is intended the use of automotive transport for the equipment will be routine. In such an arrangement, the entire combination of surveying instrument and mounting system would be transported to the desired station as a whole and lowered mechanically to the terrain where it would achieve measuring stability in a matter of seconds without extensive base manipulation.

The ultimate application of the described surveying instrument system is shown in FIG. 3 where two similar such instruments 20, 30 are depicted as having been set upon rocky terrain and as a result of each respective counterweight having acquired a substantially horizontal attitude. At this point gimbal locks 35 are engaged and the instruments are rigidly fixed against longitudinal or lateral tilt, while remaining rotatable about their vertical axes through the operation of azimuth bases 21.

The operator of each of the instruments, guided by the sight in wider angle viewing optics 22 (FIG. 2), thereupon employs the drive mechanism associated with each of the respective azimuth bases to turn the instrument into a face-to-face attitude with the other where its primary optical system with objective 11 may acquire a view of the other. In this position of instrument 20 its major axes, i.e. its horizontally-disposed, longitudinal axis 27 and its diverted line of sight 28, may be as seen in phantom in FIG. 3, where axis 27 is elevated some as yet undetermined distance above the longitudinal axis of companion instrument 30. Line of sight 28, on the other hand, being diverted at wedge 13 some six degrees from axis 27, will describe a circle 29 at instrument 30 upon one complete rotation of wedge 13.

In FIG. 4, which is presented in the form of sequential views 4a, 4b, and 4c, there are represented visual gauges, V and H, depicting the respective rotational position readings, at 44, 46, of wedge rotation measuring system 10 and azimuth circle measuring system 21. Also represented in FIG. 4 are the respective fields of view 40, and their related longitudinal axes 27 and line-of-sight circles 29, of the primary optical system of instrument 20, along with the related CCD array elements 47, as these might appear during the following described surveying procedure.

Upon having visually acquired instrument 30 in the auxiliary sighting optics 22 of instrument 20, the operator initializes, or "zeroes", the angular readings of the system at 44, 46, as shown in 42a. In this position instrument 30 and the laser target spot eminating from pinhole 33 are within the view of the primary optical system of instrument 20. The operator may now obtain a preliminary measurement of the distance between the two instruments by means of the EDM system in order to assist in quickly setting the position of mirror 18 of mislevel sensor 60 at an optimum point along longitudinal axis 27 to enable ready focus of the primary optical system of the instrument. In this manner the operator is able to bring the initial view 40a of the optical system into focus at reticle 43 which coincides with line of sight 28.

Figures 4A, 4B, 4C:
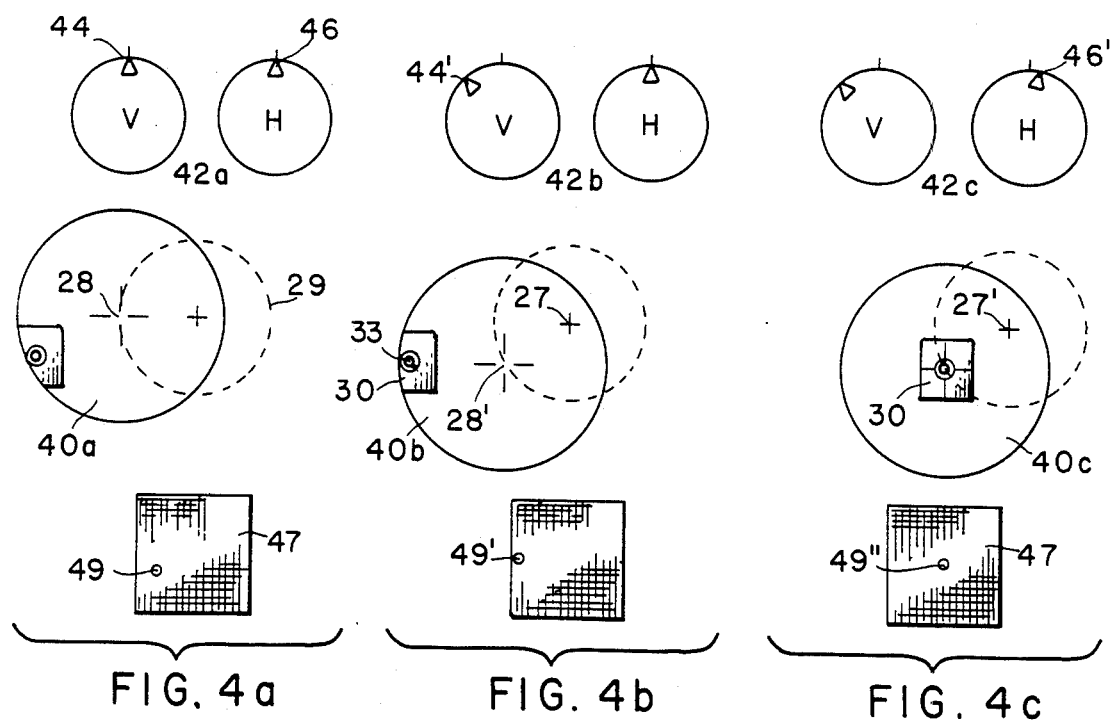
FIGS. 4a–4c are representations, in three views, of the relative fields of view and surveying instrument element positions during the surveying procedure embodying the present invention.

Through lens system 17 this view is transferred in focus to the photoactive surface of sensor 47, which in the present embodiment is a solid-state charge-coupled device area image sensor such as the 488×380-element Fairchild Company CCD222 device. By means of a video display, not shown, of the image data acquired by sensor 47, the operator may direct the following movements of elements within the system to precisely align the instrument's line of sight with that of companion instrument 30. Alternatively, the operator may allow incorporated servo-drive mechanisms within the instrument to accomplish such alignment automatically upon direction of data from CCD device indicating the displacement of the focussed laser target image 49 from the centrrix of sensor 47. As depicted in FIG. 4a, the initial, or zero, position of the elements of instrument 20 in this example are such that line of sight 28, diverted by wedge 13, is in the horizontal plane of the longitudinal axis 27 of the instrument and to the left of that axis.

Drive mechanism, not shown, is then actuated to operate through gearing 14 to rotate wedge 13 and move line of sight 28 along its displacement locus 29 to a position 28' where, at instrument 30 in field of view 40b, it is in the horizontal plane of target 33. This relative positioning is confirmed by the location of target spot image 49' at the horizontal median of sensor 47. The extent of the declination of the line of sight from the plane of axis 27 to the plane of the target spot 33, thus that of the longitudinal axis of instrument 30, is the primary measure of the difference in elevation between these two planes, and, as previously noted, must be determined with great accuracy. It is a this juncture that the basic improvement achieved by the present invention comes into play.

The degree of rotation of wedge 13 by which line of sight 28 was displaced to the level of instrument target 33 is depicted at 44' in representative vertical gauge V of view 42b in FIG. 4b. The actual measure of this rotation is accomplished through angular displacement measuring system 10, previously described, which is capable of making this determination to within about 0.3 arc seconds. While in previous utilization of such an angle measuring system to determine the direct displacement of the longitudinal axis of an entire instrument this was the limit of resolution, in the present invention the ultimate measure of the declination, or inclination, of the line of sight is an order of magnitude greater, since the sine function of the rotation rather than the degree of rotation itself is utilized for the determination. Thus, as shown in FIG. 4b, while the angular displacement of wedge 13 to position the line of sight at 28' was about 42 degrees, measured to within 0.03 arc seconds, the actual angular displacement of the line of sight was only the sine function of that angle as a factor of the the maximum displacement effected by wedge 13; i.e. 6 sin 42=4.01 degrees, or about one-tenth of the measured angular rotation of wedge 13.

The final step in the measurement procedure is the rotation of instrument 20 about its vertical axis by means of azimuth base 21 to bring its line of sight into conjunction with the wedge-centered spot target of instrument 30, an operation which again may be accomplished under the direct control of the operator or by means of servo-control, and which may further be effected simultaneously with the wedge rotation operation. This instrument rotation is primarily for the purpose of providing a more direct line between the instruments to ensure a correct EDM distance measurement, and is depicted in FIG. 4c as the shift of the longitudinal axis to its new position 27' relative to instrument 30 in view 40c, and movement of target image 49" to the centrix of CCD 47.

The amount of azimuth rotation required to effect this approximately 5.5 degrees of angular displacement is represented by the movement of horizontal gauge H in 42c by that actual amount to new position 46'. A comparison of the representative gauge positions at 42c will give one a ready appreciation of the substance of the measuring system of the present invention. Thus, by virtue of the wedge rotation procedure approximately the same angular displacement, i.e. 4.01 vis-a-vis 5.5 degrees, is accomplished in each of the vertical and horizontal planes, yet that of the vertical allows for nearly ten-fold greater displacement resolution with a like increase in accuracy resulting.

After this establishment of the line of sight between the instruments, the EDM system is activated and the slant distance between them is determined in the usual manner. Assuming, in the present example, such a distance of about 30.0 meters, noting that the actual distance between instrument centers which are to be located precisely at the station points includes predetermined offsets, the difference in elevation between those points would be calculated as 30 sin 4.01 degrees=2.098 meters.

Simultaneously with that at instrument 20, the measuring procedure is carried out at companion instrument 30 with the same accuracy and, ideally, the same result. Any discrepancy, however, between the calculated elevation differences would be halved in the average of the two results. In order to further remove imperfections in mechanical elements or electronic responses, the measuring procedure is initially repeated after a rotation of mislevel sensor 60 by 180 degrees upon bearing 63 to present opposite mirrored pendulum weight face 18' in the primary optical system to thereby average any error there might be as a result of a mechanical set in pendulum leaf suspension element 66. Remaining deviations of the longitudinal axes of the instruments from the horizontal are detected by respective sensor systems 60 and are factored into the final calculations. Additional errors which might arise from atmospheric scintillations and electrical noise are reduced by statistically effective numbers of repetitions of the complete measuring cycle, and any wedge error might be reduced by complementary symmetrical quadrant measurements, as previously suggested.

In the event that it is desired to determine the initial elevation datum of the first measuring instrument with respect to an established benchmark, there would be substituted, as previously mentioned, a retroreflector such as the usual cube-corner for the second instrument. In this manner the laser light illuminated pin-hole 23 of instrument 20 would serve, upon reflection from the cube-corner, as the target spot for that instrument, and the retroreflector would be utilized with the EDM system as well.

The foregoing embodiment has been presented for the purpose of illustration and should not be taken to limit the scope of the present invention. It should be appreciated that such embodiment is capable of additional variations and modifications which, with those suggested, are likewise to be included within the scope of the invention as set forth in the appended claims.

What is claimed is:
1. Measuring apparatus comprising:
   (a) an instrument including optical target viewing means comprising an objective lens;
   (b) an optical wedge element situated on a first segment of the line of sight of said viewing means at a point between said objective lens and a target under observation, thereby to divert said line of sight a fixed degree from said first segment;
   (c) means mounting said wedge for controlled incremental rotation about said line of sight segment, thereby to cause said diverted line of sight to be displaced a controlled distance along a circle segment at the perpendicular plane of said target;

(d) controllable drive means for rotating said wedge mounting means and effecting said incremental wedge rotation;

(e) angle-measuring means associated with said wedge mounting means for indicating the extent of said incremental rotation thereof;

(f) azimuth base means mounting said instrument in a substantially horizontal plane;

(g) controllable azimuth base drive means for incrementally rotating said instrument about an axis substantially perpendicular to said first line of sight segment;

(h) photoelectric image sensing means situated on the line of sight of said viewing means at a focal plane thereof for providing electrical data indicative of the relative position of a sensible photic target image with respect to a predetermined point on the photosensitive surface of said image sensing means;

(i) means responsive to said electrical data for controlling the respective wedge- and instrument-rotating drive means, thereby to cause movement of said target image toward said predetermined point; and (j) distance measuring means for determining the distance between said instrument and said target.

2. Measuring apparatus according to claim 1 which further comprises means for projecting upon the surface of said wedge at its intersection with said diverted line of sight a photic target image sensible by said photoelectric means.

3. Measuring apparatus according to claim 1 which further comprises:

(a) a second line of sight segment situated coincident with the longitudinal axis of said instrument;

(b) means for orienting and maintaining said longitudinal axis substantially in a horizontal plane; and (c) a capacitive electronic mislevel sensor situated on said second line of sight segment with its moveable electrode pendulously suspended on a vertical axis and having at least one plane reflective surface perpendicular to and intercepting said second line of sight segment, the stationary electrodes of said second which enclose said moveable electrode comprising transparent plates each having on the inwardly facing surface thereof a layer of electrically conductive material, at least a minimal window area of such layer situated on said second line of sight segment being light-transparent, thereby to provide for reflection of said line of sight from said moveable electrode surface in order to maintain said line of sight in said horizontal plane upon any deviation of said longitudinal axis from said horizontal plane.

4. Measuring apparatus according to claim 3 wherein said moveable electrode comprises two opposed parallel plane reflective surfaces at least one of which is normally disposed to intercept said second line of sight segment, and wherein said mislevel sensor is mounted for actuatable 180 degree rotation about said vertical axis, thereby enabling the actuatable alternative presentation of one and the other of said reflective surfaces to said second line of sight segment.

5. Measuring apparatus according to claim 4 wherein said mislevel sensor is mounted for selectable incremental movement along said instrument longitudinal axis, thereby to enable selected changes in the focal length of said optical target viewing means.

6. A procedure for determining the difference in elevation between two horizontal datum planes, said procedure comprising:

(a) positioning a target in the first of said datum planes;

(b) providing optical target viewing means comprising an objective lens and having an internal longitudinal line of sight;

(c) orienting said viewing means so as to position said longitudinal line of sight coincident with the second of said datum planes and its field of view encompassing said target;

(d) situating an optical wedge having a fixed diversion angle upon the viewing means line of sight at a point adjacent said objective lens and intermediate said lens and the line-of-sight-perpendicular vertical plane of said target;

(e) orienting said wedge to divert the viewing means line of sight by said fixed angle on said second datum plane;

(f) rotating said wedge about the segment of said line of sight extending between said lens and said wedge to thereby displace the diverted line of sight along a circular arc at said vertical target plane to intersection with said first datum plane;

(g) simultaneously with said wedge rotation, rotating said viewing means upon its vertical axis to thereby displace said diverted line of sight to intersection with said target;

(h) determining the degree of said wedge rotation required to effect said line of sight target intersection;

(i) calculating trigonometrically from said degree of wedge rotation and said wedge diversion angle the vertical angular displacement of said line of sight from said wedge to said target;

(j) determining the distance between said wedge and said target; and (k) calculating trigonometrically from said distance and said vertical displacement angle the difference in elevation between said datum planes.

7. A procedure according to claim 6 which further comprises:

(a) providing as said target viewing means and as a second target viewing means a first and a second measuring apparatus, each comprising:

(i) an instrument including optical target viewing means comprising an objective lens;

(ii) azimuth base means mounting said instrument in a substantially horizontal plane;

(iii) an optical wedge element situated on a first segment of the line of sight of said viewing means at a point between said objective lens and a target under observation, thereby to divert said line of sight a fixed degree from said first segment;

(iv) means mounting said wedge for controlled incremental rotation about said line of sight segment, thereby to cause said diverted line of sight to be displaced a controlled distance along a circle segment at the perpendicular plane of said target;

(v) controllable drive means for rotating said wedge mounting means and effecting said incremental wedge rotation;

(vi) angle-measuring means associated with said wedge mounting means for indicating the extent of said incremental rotation thereof;

(vii) controllable azimuth base drive means for incrementally rotating said instrument about an axis substantially perpendicular to said first line of sight segment;

(viii) photoelectric image sensing means situated on the line of sight of said viewing means at a focal plane thereof and providing electrical data indicative of the relative position of a sensible photic target image with respect to a predetermined point on the photosensitive surface thereof;

(ix) means for projecting upon the surface of said wedge at its intersection with said diverted line of sight a photic image sensible by said photoelectric means;

(x) means responsive to said electrical data for controlling the respective wedge- and instrument-rotating means, thereby to cause movement of said target image toward said predetermined point; and (xi) distance measuring for determining the distance between said instrument and said target;

(b) projecting a photic target image on said second measuring apparatus wedge surface;

(c) positioning as said first datum plane target said second apparatus photic target image;

(d) projecting a photic target image on said first measuring apparatus wedge surface;

(e) positioning in said second datum plane said first apparatus photic target image;

(f) orienting each said measuring apparatus to encompass within its field of view the photic target image of the other;

(g) carrying out with each said measuring apparatus steps (e) through (k) of claim 6 to thereby calculate with respect to each the difference in elevation; and (h) averaging said calculated differences in elevation.

* * * * *